(12) United States Patent
Schofield et al.

(10) Patent No.: US 6,294,989 B1
(45) Date of Patent: Sep. 25, 2001

(54) TIRE INFLATION ASSISTANCE MONITORING SYSTEM

(75) Inventors: Kenneth Schofield; Niall R. Lynam, both of Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/513,941

(22) Filed: Feb. 28, 2000

Related U.S. Application Data

(63) Continuation-in-part of application No. 09/213,075, filed on Dec. 16, 1998, now Pat. No. 6,124,647.

(51) Int. Cl.[7] .................................................. B60C 23/00
(52) U.S. Cl. ........................ 340/442; 340/438; 340/443
(58) Field of Search .................................. 340/438, 442, 340/443, 446, 447, 475; 307/10.1, 10.2; 362/494, 83.1; 116/28 R, 34 R

(56) References Cited

U.S. PATENT DOCUMENTS

| | | | |
|---|---|---|---|
| 5,371,659 | 12/1994 | Pastrick et al. | 362/494 |
| 5,669,705 | 9/1997 | Pastrick et al. | 362/494 |
| 5,786,772 | 7/1998 | Schofield et al. | 340/903 |
| 5,863,116 | 1/1999 | Pastrick et al. | 340/475 |

OTHER PUBLICATIONS

Commonly assigned co–pending United States patent application Ser. No. 09/102,414 filed Jun. 22, 1998, by Todd W. Pastrick et al., for a Vehicle Exterior Mirror System with Signal Light. Issued: 362/494 Sep. 11, 2000.

Commonly assigned co–pending United States patent application Ser. No. 09/335,010, filed Jun. 18, 1999, by Todd W. Pastrick et al., for a Vehicle Exterior Mirror System with Signal Light.

Commonly assigned co–pending United States patent application Ser. No. 09/596,015, filed Jun. 16, 2000, by Todd W. Pastrick, for Vehicle Exterior Mirror System with Turn Signal Light Assembly.

*Primary Examiner*—Van T. Trieu
(74) *Attorney, Agent, or Firm*—VanDyke, Gardner, Linn & Burkhart, LLP

(57) ABSTRACT

A vehicular tire inflation monitoring system is provided for a vehicle that includes at least one tire inflation indicator assembly, visible exterior of the vehicle, positioned at an exterior vehicle portion, such as at an exterior rearview mirror assembly. The at least one tire inflation indicator assembly provides an indication of the inflation condition of at least one of the vehicle tires. The tire inflation monitoring system includes a control receiving at least one input from at least one tire pressure sensor sensing pressure of at least one vehicle tire. The control produces an output to illuminate the at least one tire inflation indicator assembly.

69 Claims, 4 Drawing Sheets

| | | |
|---|---|---|
| 42 | PRESSURE SENSED BY TIRE PRESSURE SENSOR(S) BEING SUBSTANTIALLY WITHIN A PREDETERMINED NORMAL PRESSURE RANGE | FIRST INDICATION | 40 |
| 46 | PRESSURE SENSED BY TIRE PRESSURE SENSOR(S) BEING SUBSTANTIALLY LESS THAN THE NORMAL PRESSURE RANGE | SECOND INDICATION | 44 |
| 50 | PRESSURE SENSED BY TIRE PRESSURE SENSOR(S) BEING SUBSTANTIALLY GREATER THAN THE NORMAL PRESSURE RANGE | THIRD INDICATION | 48 |
| 54 | PRESSURE SENSED BY TIRE PRESSURE SENSOR(S) UNDERGOING CHANGE INDICATIVE OF ASSOCIATED TIRE UNDERGOING INFLATION | FOURTH INDICATION | 52 |

TIRE INFLATION ASSISTANCE MONITORING SYSTEM

CROSS-REFERENCE TO RELATED APPLICATION

This application is a continuation-in-part of application Ser. No. 09/213,075 filed Dec. 16, 1998, now U.S. Pat. No. 6,124,647.

BACKGROUND OF THE INVENTION

This invention relates generally to vehicular function monitoring and display systems. More particularly, the invention is related to a system for assisting the manual inflating of tires while mounted on the wheels of a vehicle. Most particularly, this invention is related to a system for assisting the manual inflating of tires of the vehicle that includes an indicator assembly positioned on an exterior vehicle portion such as an exterior mirror assembly.

Remote tire pressure sensors have been developed which sense tire pressure and transmit, such as via a radio frequency link, the tire pressure to a vehicle-based controller. The information regarding tire pressure may be used to control vehicle safety-based devices, such as ride and comfort control systems, road-handling systems, braking systems, and the like. It is also known to utilize such sensors in combination with tires that can run without inflation in order to warn the driver that the tire is operating in an emergency mode and should be driven at a limited speed for a limited distance.

It is known to utilize various gauges and displays in view of the driver. For example, it is known to place a display of vehicle tire pressure within the interior cabin of the vehicle in view of the driver. This includes displaying the vehicle tire pressure in an interior mirror-based display. Typically, such displays mounted in the interior cabin provide a read-out of the inflation status of individual tires on the vehicle, such as an alphanumerical read-out of tire pressure or an icon indicative of tire pressure status. For example, a read-out or an icon indicative of the individual tire pressures at the four wheels on an automobile can be displayed at the reflective element of the interior rearview mirror assembly. While such displays alert the driver of the vehicle sitting in the interior vehicular cabin when the vehicle is operating as to the inflation status of individual tires present on the vehicle, they are little to no aid to a driver or other person while actually pumping air into or bleeding air from an individual tire in response to recognition of an undesired tire inflation pressure. While pumping air into or bleeding air from a tire mounted on a vehicle (such as commonly occurs at service stations and the like), a person typically uses an air line connected to an air compressor. The air line is manually connected to an inflation valve provided at the vehicular tire; the person presses the air line to a nipple of the tire valve, and, by so doing, pressurized air is allowed pass through the tire valve, or escape from the tire valve, to inflate or deflate tire pressure to the desired pressure value. To so do, typically the engine is turned off and the driver exits the vehicle, and crouches down at a particular wheel on a side of the vehicle in order to adjust the tire pressure at that particular wheel. While so doing, the driver typically does not have a view of the vehicle interior, and typically relies on a hand-held tire pressure gauge or on a gauge provided on the air line used for tire pressure adjustment. Thus, even though the vehicle tire may be equipped with a sensor for measuring the air pressure in the tire, in systems known to date, this tire pressure monitoring sensor does not provide a readily readable indication of correct or incorrect tire inflation pressure to the person external to the vehicle who is adjusting the tire pressure in that tire on the vehicle, and especially while that person is in the act of adjusting that tire pressure.

SUMMARY OF THE INVENTION

The present invention provides a new and useful system that provides an indicator external of the vehicle to indicate the inflation condition of the vehicle tires. The present invention provides a readily readable indication of correct or incorrect tire inflation pressure to a person external to the vehicle who is adjusting the tire pressure in that tire on the vehicle, and especially while that person is in the act of adjusting that tire pressure. Preferably, the indicator is positioned at an exterior vehicle portion, such as a vehicle exterior rearview mirror assembly, where the indicator can be observed by a user inflating or deflating the vehicle tires located at the vehicle side of that exterior vehicle portion. However, the present invention may also be used as a convenient indicator to the driver or passenger entering a vehicle that one or more of the vehicle tires are in an under-pressure or over-pressure condition.

According to the invention, a tire inflation monitoring system suitable for use on a vehicle is provided that comprises at least one tire inflation indicator assembly positioned at an exterior vehicle portion at a side of the vehicle and visible exterior the vehicle. The at least one tire inflation indicator assembly provides an indication of the inflation condition of at least one vehicle tire positioned at that side of the vehicle, and wherein the tire inflation monitoring system includes a control receiving at least one input from at least one tire pressure sensor sensing pressure of the at least one vehicle tire, and the control producing an output to illuminate the at least one tire inflation indicator assembly in response to a tire pressure condition.

A vehicle exterior rearview mirror system, according to an aspect of the invention, includes at least one exterior rearview mirror assembly mounted on a side of the vehicle. The exterior rearview mirror assembly includes a reflective element and a support for the reflective element. The system further includes a tire inflation monitor including at least one tire inflation indicator assembly positioned at the exterior rearview mirror assembly and visible exterior of the vehicle. The at least one indicator assembly provides an indication of the inflation condition of at least one of the vehicle tires mounted to wheels of the vehicle on the side of the vehicle to which the exterior mirror assembly is mounted. The tire inflation monitor includes a control receiving at least one input from at least one tire pressure sensor sensing pressure of at least one of the vehicle tires. The tire inflation monitor further includes a control producing an output to illuminate the at least one tire inflation indicator assembly.

By providing a tire inflation monitor visible exterior of the vehicle, the present invention provides an indication to a vehicle user at a desirable location that provides a useful assistance to the user, or an attendant, inflating the vehicle tires. This is accomplished by providing a tire inflation indicator at the exterior rearview mirror assembly in order to be visible at the vehicle tires. As the vehicle tires are inflated from an under-pressure to an operating pressure range, the indicator provides an indication of this change. The indicator may also provide an indication when the tires are inflated to an over-inflated condition. The invention also provides a useful indication as the driver enters the vehicle or exits the vehicle that attention to the tires is necessary.

These and other objects, advantages, and features of this invention will become apparent upon review of the following specification in conjunction with the drawings.

BRIEF DESCRIPTION OF THE DRAWINGS

FIG. 7 is diagram illustration operation of a tire inflation indicator assembly, according to an aspect of the invention.

DESCRIPTION OF THE PREFERRED EMBODIMENT

Figure 1:
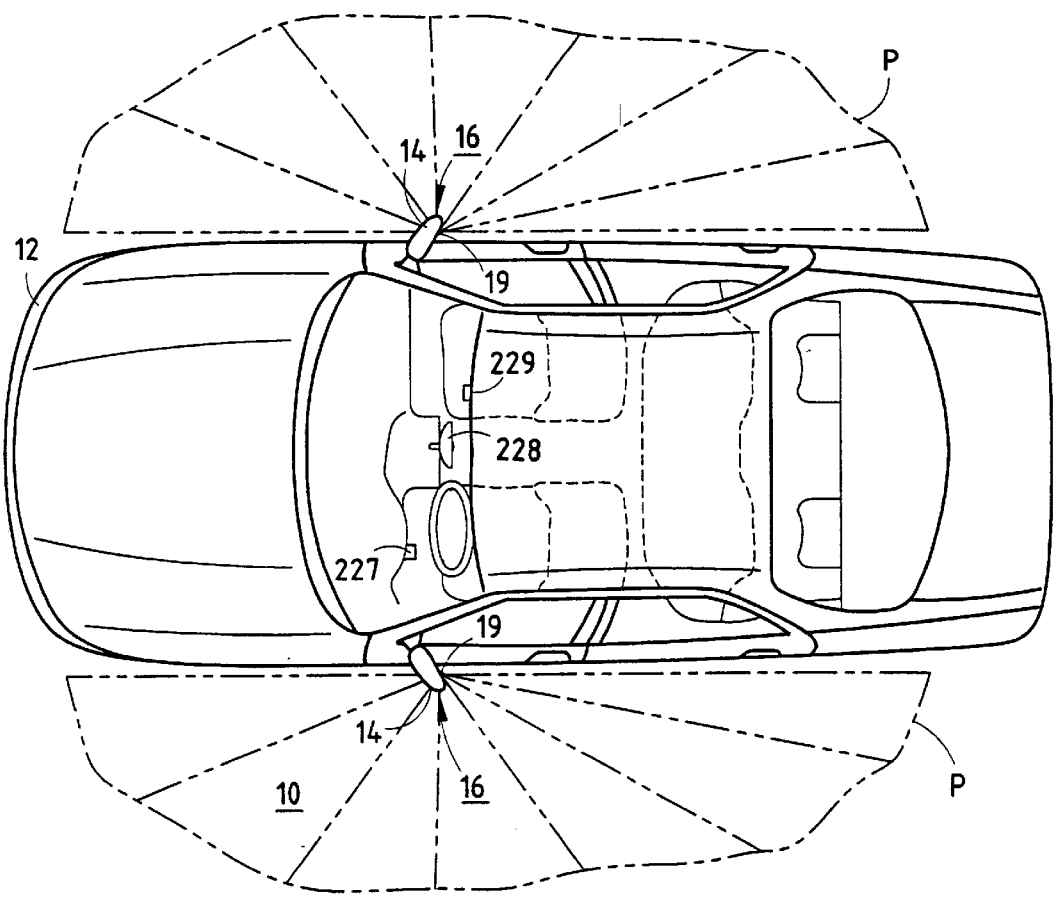
FIG. 1 is a top plan view of a vehicle exterior rearview mirror system equipped with tire pressure indicator assemblies, according to the invention.
Figure 2:
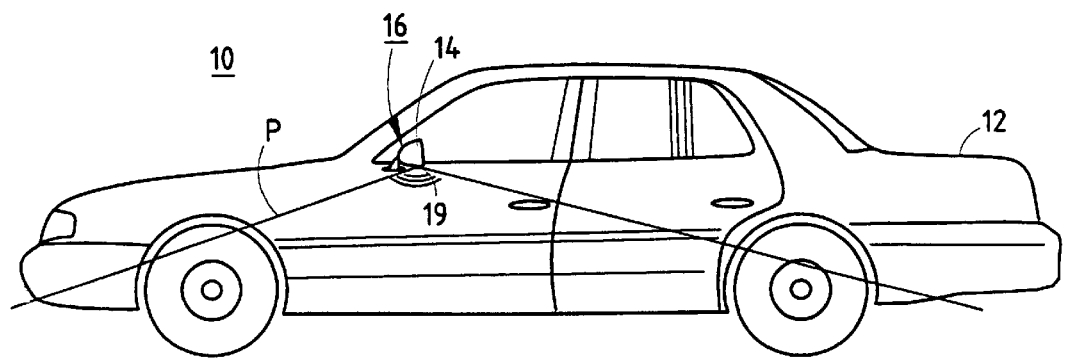
FIG. 2 is a side elevation of the vehicle in FIG. 1.
Figure 6:
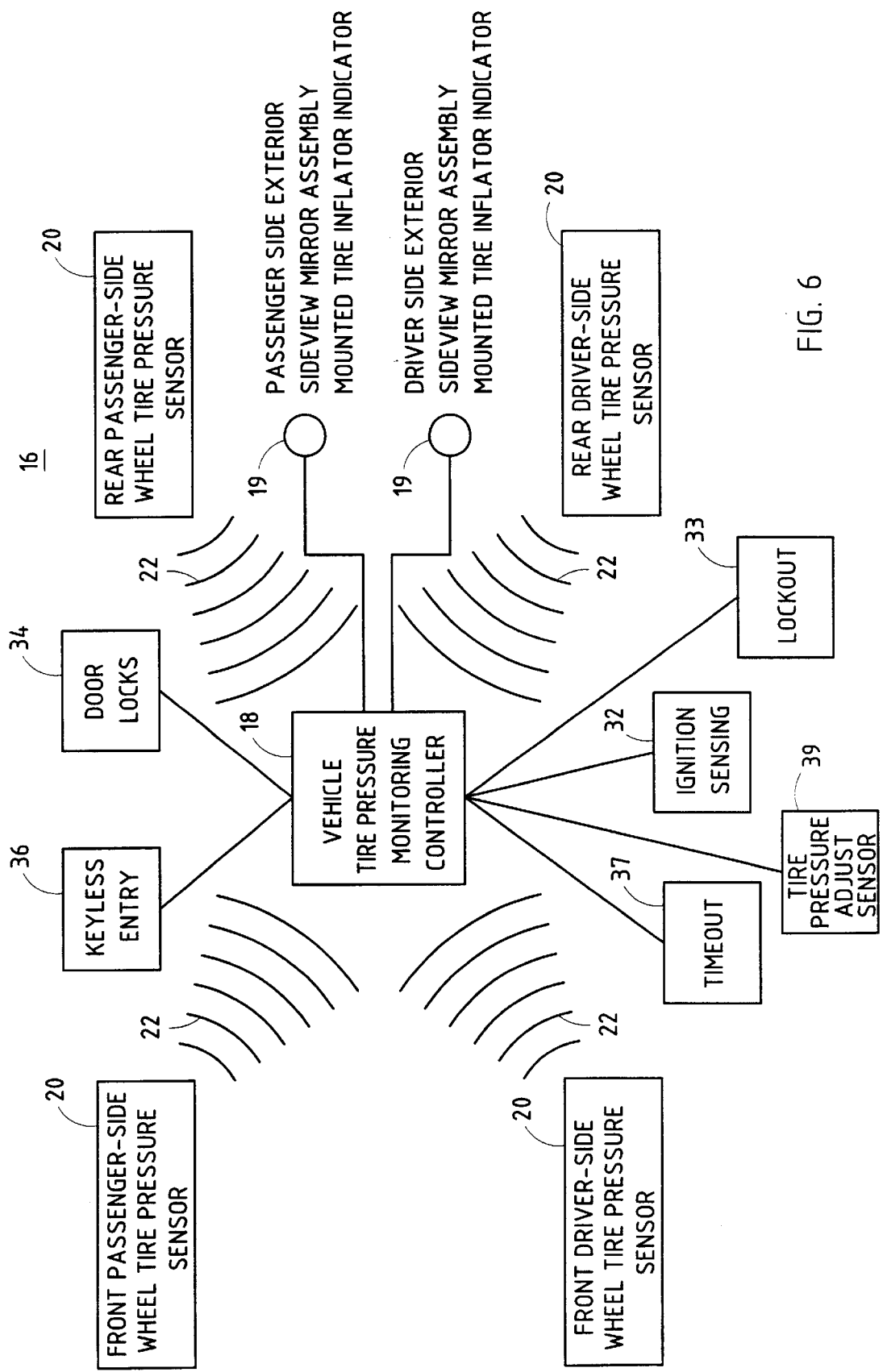
FIG. 6 is an electrical block diagram of a tire inflation monitoring system, according to the invention.

Referring now specifically to the drawings, and the illustrative embodiments depicted therein, a vehicle exterior rearview mirror system 10 for use with vehicle 12 includes one or more exterior rearview mirror assemblies 14 and a tire inflation monitoring system 16 (FIGS. 1, 2 and 6). Tire inflation monitoring system 16 includes at least one tire pressure indicator assembly 19 positioned at exterior rearview mirror assembly 14, a control 18, and one or more tire pressure sensors 20, each associated with one of the vehicle tires. Each tire pressure sensor 20 is connected wirelessly with control 18 by a wireless communication link 22 that, in the illustrated embodiment, is a radio frequency (RF) link. Tire pressure sensor 20 is commercially available from several sources and conventionally includes a wireless communication link 22 with a vehicle controller. Control 18 is an electronic control, and is preferably a microprocessor-based electronic control, but may, alternatively, be a digital logic controller, an analog controller, or the like. Preferably, control 18 performs additional vehicle functions. Most preferably, control 18 is interconnected with a vehicle serial bus system such as of the type disclosed in commonly assigned U.S. Pat. No. 5,959,367, the disclosure of which is hereby incorporated herein by reference.

Figure 3:
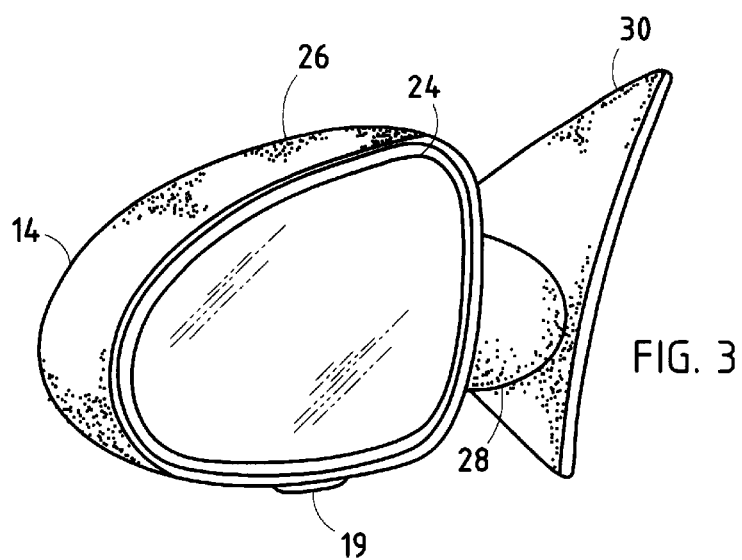
FIG. 3 is a perspective view of a vehicle exterior rearview mirror assembly, according to the invention.
Figure 4:
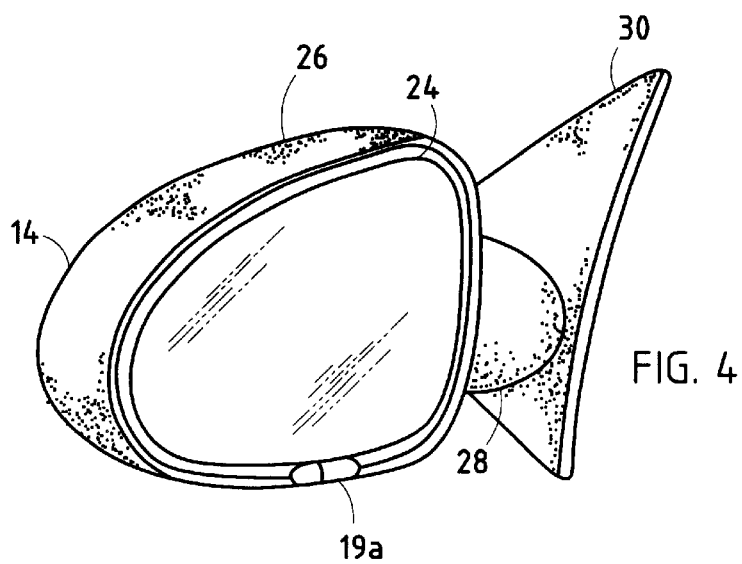
FIG. 4 is the same view as FIG. 3 of an alternative embodiment thereof.
Figure 5:
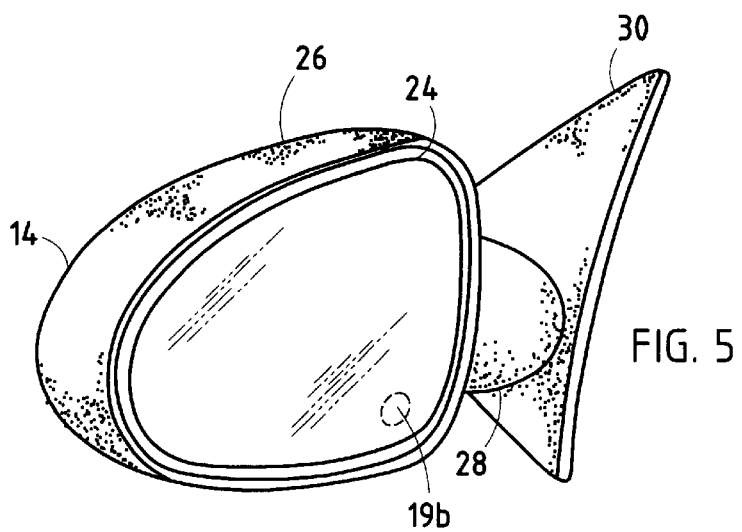
FIG. 5 is the same view as FIG. 3 of an alternative embodiment thereof.

Exterior rearview mirror assembly 14 includes a reflective element 24 and a support 26 supporting the reflective element by vehicle 12 (FIGS. 3–5). As is conventional, support 26 includes a fixed portion 28 attached to vehicle 12 and a movable portion (not shown) which movably supports reflective element 24. Preferably, the movable portion is an electrically controlled actuator of the type disclosed in commonly assigned patent application Ser. No. 09/228,348, filed Jan. 11, 1999, by Schnell et al., the disclosure of which is hereby incorporated herein by reference. Reflective element 24 may be any of several reflectors such as glass coated on its first or second surface with a suitable reflective layer or layers, such as disclosed in U.S. Pat. No. 5,179,471, the disclosure of which is hereby incorporated herein by reference, or, preferably, an electro-optic reflective element, and, most preferably, an electrochromic mirror element. However, the invention applies to all forms of reflective element 24. Electrochromic reflective elements 24 may be of any type such as disclosed in U.S. Pat. No. 4,902,108 issued to Byker; commonly assigned U.S. Pat. No. 5,668,663 issued to Varaprasad et al.; commonly assigned U.S. Pat. No. 5,724,187 issued to Varaprasad et al; commonly assigned U.S. Pat. No. 6,002,511 issued to Varaprasad et al.; commonly assigned U.S. Pat. No. 5,140,455 issued to Varaprasad et al.; commonly assigned U.S. Pat. No. 5,910,854 issued to Varaprasad et al. and commonly assigned U.S. patent application Ser. No. 08/429,643 filed Apr. 27, 1995, by Varaprasad et al. entitled ELECTROCHROMIC MIRRORS AND DEVICES, now U.S. Pat. No. 5.724,187 the disclosures of which are hereby all incorporated herein by reference. Electrochromic reflective elements 24 include electrochromic units, or cells, that decrease in transmissivity in response to a drive signal applied thereto. Most preferably, reflective element 24 comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., now U.S. Pat. No. 6,154,306 the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the frontmost surface of the rear substrate (the third surface as known in the mirror art) is reflector coated with a high reflecting metal film such as of aluminum or silver, or an alloy of aluminum or silver, optionally overcoated with a transparent electronic conductor coating such as of indium tin oxide or of doped tin oxide.

Exterior rearview mirror assembly 14 may include other elements and functions as disclosed in commonly assigned U.S. Pat. Nos. 6,019,475; 5,371,659; 5,971,552; and 5,497,306, the disclosures of which are hereby incorporated herein by reference.

Tire inflation indicator assembly 19 preferably generates a pattern of light P viewable from the location of the tires of the vehicle on the side of the vehicle with which tire pressure sensors 20 are associated. In this manner, a user of the vehicle or an attendant or mechanic may inflate the vehicle tires while observing the pattern of light P generated by the tire pressure indicator assembly 19. This may be accomplished by mounting tire inflation indicator assembly 19 to a lower surface 30 of the portion of exterior rearview mirror assembly 14 that houses the mirror reflector. In addition to producing a pattern of light P, which is visible at the tires on the side of the vehicle with which the associated tire inflation indicator assembly 19 is located, the pattern of light P preferably will not be substantially visible to the driver of the vehicle. This avoids any distraction to the driver from the tire inflation indicator assembly while the driver is in the vehicle. Furthermore, there is less wind noise below the exterior rearview mirror assembly 14. Thus, the presence of the tire pressure indicator assembly there does not substantially contribute to wind noise generated by the exterior rearview mirror assembly. Furthermore, the bottom portion of exterior rearview mirror assembly 14 is typically hollow and provides a convenient attachment point for the tire inflation indicator assembly. Because the exterior mirror assembly protrudes outwardly from the vehicle body, locating the tire inflation indicator assembly at the exterior mirror assembly, and especially at a lower portion of the part of the exterior mirror assembly that houses the mirror reflector element, is advantageous. This is because such a location renders the indicator of the tire inflation indicator assembly readily visible to a person positioned at either or both of the front wheel tire and the rear wheel tire of the vehicle who is inflating/deflating a tire, and especially when the person adjusting the tire pressure is crouched down at a vehicle wheel tire while manually adjusting its tire pressure. For example, a tire inflation indicator assembly that includes a light source, such as a light-emitting diode, can protrude from the underside of the casing part of the exterior mirror assembly that houses the mirror reflector element. Thus, whether the user adjusting tire pressure is located at a front wheel tire or a rear wheel tire at one of the driver side or the passenger side of the vehicle, the user can see a single indicator of the tire inflation indicator assembly that is positioned below the casing of the exterior mirror assembly on that side, and that preferably protrudes therefrom (for example, as a pendant element), as he or she crouches down at that particular wheel tire on that particular vehicle side. It is preferable, for economy, that a single tire inflation indicator assembly be provided on an exterior vehicle portion of a side of the vehicle at a location visible to a person inflating either a front wheel tire of that side or a rear wheel tire of that side.

In an alternative embodiment, a tire inflation indicator assembly 19a may be positioned at fixed portion 28 of support 26. In the embodiment illustrated in FIG. 4, tire inflation indicator assembly 19a is illustrated on a surface directed rearwardly of vehicle 12 where it would generate a pattern of light visible at a rear tire of the vehicle on the side of the vehicle on which tire inflation indicator assembly 19a is located. Another tire inflation indicator assembly (not shown) may be positioned on a forward-facing portion of fixed portion 28, thereby being visible at the area around the forward tire on the same side of the vehicle on which the tire inflation assembly is located.

In another alternative embodiment illustrated in FIG. 5, a tire inflation indicator assembly 19b is positioned with the movable portion of support 26, such as on reflective element 24. Preferably, tire inflation indicator assembly 19b is positioned behind reflective element 24, thereby protected from environmental elements such as road splash, car washes, and the like. This is accomplished by removing a portion of a reflective coating on reflective element 24 such that tire inflation indicator assembly 19b is viewable through reflective element 24 (or by using a semitransparent mirror reflector such a dichroic mirror element such as is described in U.S. Pat. No. 5,361,190, the entire disclosure of which is hereby incorporated by reference herein). Tire inflation indicator assembly 19b may be joined with reflective element 24 according to the principles disclosed in U.S. Pat. No. 5,416,313 entitled DISPLAY FOR AUTOMATIC REARVIEW MIRROR, the disclosure of which is hereby incorporated herein by reference.

Other mountings for tire inflation indicator assembly, according to the invention, may be apparent to the skilled artisan. For example, the tire inflation indicator assembly may be mounted at the sail portion 30 of exterior rearview member assembly 14 or a portion of vehicle 12 adjacent to exterior rearview mirror assembly 14. Also, the tire inflation indicator assembly can be located at an exterior vehicle portion other than at the exterior mirror assembly. For example, a tire inflation indicator assembly can be located at a vehicle body side panel, such as at or part of a side marker assembly, or as part of a door panel assembly. Optionally, a tire inflation indicator assembly can be located at each wheel tire location, so that a person inflating or deflating a particular tire can see the indicator of tire pressure local to the particular wheel tire being inflated/deflated. Other elements may be combined with the tire inflation indicator assembly. For example, a temperature sensor for sensing the exterior temperature surrounding the vehicle may be positioned in a common housing with the tire inflation indicator assembly. Furthermore, the tire inflation indicator assembly may be positioned at a side-mounted camera assembly for a rearview camera vision system of the type disclosed in commonly assigned International Publication WO 96/38319, published Dec. 5, 1996, the disclosure of which is hereby incorporated herein by reference.

Tire inflation indicator system 16 optionally comprises a lockout 33 that prevents inadvertent actuation of tire inflation indicator assemblies 19 during operation of vehicle 12. Such lockouts are conventional and preferably comprise a circuit that is responsive to the vehicle being placed in gear or to the vehicle reaching a determined speed (such as at least 5 miles per hour), or to turning an ignition switch to operate the engine. When the lockout circuit senses that the vehicle is operating or in a condition to operate, operation of tire inflation indicator assemblies 19 is optionally disabled. Thus, receipt of an input indicative of operation of the vehicle by tire pressure monitoring controller 18 from lockout 33 would disable operation of tire inflation indicator assemblies 19. Thus, and optionally, control 18 processes the input 32 in order to lock out illumination of tire inflation indicator assemblies 19 during operation of vehicle 12. This further reduces the likelihood of the tire inflation monitoring system providing a distraction not only to the driver of vehicle 12 during normal driving of vehicle 12, but also to operators of vehicles in the vicinity of vehicle 12. Tire inflation monitoring system 16 may additionally receive an input 34 indicative of the locked state of the vehicle doors. Preferably, control 18 provides outputs to illuminate tire inflation indicator assemblies 19 only when the vehicle doors are in an unlocked state, which is likely when the tires of the vehicle are being inflated. Most preferably, control 18 is capable of illuminating tire inflation indicator assemblies 19 in response to a sensed tire inflation condition only for a predetermined period of time after door lock input 34 indicates that the vehicle doors have changed to an unlocked state and, optionally and preferably, after ignition sensing circuit 32 indicates that the vehicle ignition is not operating (i.e., the engine is off). This period of time, which is determined by timeout 37, may be less than or equal to about two hours and, preferably, less than or equal to about 30 minutes. Most preferably, this predetermined period of time is less than or equal to about 15 minutes. Control 18 may additionally produce outputs to illuminate tire inflation indicator assemblies 19 in response to a tire pressure sensor 20 sensing commencement of a manual tire pressure adjust event such as by sensing a change in pressure of its associated tire indicative of a user of the vehicle inflating/deflating that tire, or sensing depression of the close-out nipple provided in the tire valve stem to allow connection to an air hose/to allow bleed off of tire pressure. In this manner, the tire inflation indicator assembly is illuminated when it is of assistance to the manual inflation of the tires. The tire inflation assembly may stay capable of illumination after a given event (such as unlocking a door, opening a door, turning off the vehicle ignition, detection of an indication of a manual tire pressure adjust event) for a predetermined period of time which, for example, is less than or equal to about two hours and, preferably, is less than or equal to about 30 minutes and, most preferably, is less than or equal to about 15 minutes.

Provision of door lock input 34 and/or ignition sensing circuit 32 and/or timeout 37 is advantageous towards ensuring that the tire inflation indicator system 16 remains armed and powered for a sufficient time period to allow the driver to pull up to a service station to service tire pressures, but not so that the tire inflation indicator system 16 would remain powered and armed all the time a vehicle is parked (and thus risk depleting the vehicle battery which typically operates at 12 volts nominal). Since sensors 19, controller 18 and other electronic elements of system 16 require electric power to operate, and since when stopped at a service station it is usual and safest to turn off the vehicle ignition while attending to the tire pressures, tire inflation indicator system 16 typically will operate on vehicle battery power while the driver is inflating/deflating tires on wheels mounted to the vehicle, and so system 16 includes a battery depletion protection to obviate running down the battery when the vehicle is normally parked.

Tire inflation indicator system 16 optionally comprises a tire pressure adjust sensor 39 that provides an input to controller 18 alerting that a manual tire pressure adjust event is beginning. Thus, for example, when the vehicle is parked, tire inflation indicator system 16 optionally remains in a quiescent, armed mode (that draws very little current from the vehicle battery, with a current draw of less than about 15 milliamps preferred, a current draw of less than about 10 milliamps more preferred, and a current draw of less than about 5 milliamps most preferred). Thus, even when prolonged parked, tire inflation indicator system 16 is powered but active only in a monitoring, low-current state, and with controller 18 monitoring an input from tire pressure adjust sensor 39. When a manual tire pressure adjust event is detected by tire pressure adjust sensor 39 (such as by detection of depression of the close-off nipple in the valve stem at the particular wheel tire at a side of the vehicle a person is manually inflating from a compressed air line, or by detection of a change in tire pressure indicative of a user-actuated tire inflateldeflate event), controller 18 activates the appropriate tire inflation indicator assembly 19 on that particular vehicle side in order to indicate to the person attending to the tire, who typically is crouching down at the wheel tire, the tire pressure status in that particular tire. Since significant current consumption is typically only required by the indicator light sources themselves, use of tire pressure adjust sensor 39 can allow system 16 to be in an armed but low power state continually and with the vehicle parked and the vehicle ignition turned off so that vehicle battery power alone is provided to system 16. Once tire pressure adjust sensor 39 detects that the tire adjust event is complete and/or timeout 37 times-out, any illumination of indicator(s) 19 can cease, and system 16 can revert to its quiescent, low current consumption state (and so minimize depletion of vehicle battery charge).

Note also that an interior cabin display of tire pressure status (such as via a display at a location within the vehicle interior cabin such as at or on the interior rearview mirror assembly) can optionally be provided as part of system 16, most preferably though only when ignition sensing circuit 32 indicates that the vehicle ignition is operational and the engine is running. Thus, when operating the vehicle while driving on the highway, or when stopped with the engine running, the driver can view a display located in the interior cabin that alerts as to tire pressure status at the individual vehicle wheels. When the driver determines that the tire pressure at a particular wheel needs adjustment, he or she can drive to a service station or the like, stop at an air compressor, preferably (for safety) turn off the engine, and exit the vehicle to manually inflate/deflate the particular tire, while aided by the tire inflation assistance monitoring system of this present invention. Alternately, the driver can remain in the vehicle, and have a service attendant manually inflate/deflate the particular tire, while aided by the tire inflation assistance monitoring system of this present invention. Provision of the tire inflation assistance monitoring system of this present invention as an additional feature to an interior vehicle cabin tire pressure status displaying system is a significant enhancement to such a system, and it can be added economically, given that many of the components, such as tire pressure sensors, wireless transmission transmitter/receivers and the like, are already existing in the interior vehicle cabin tire pressure status displaying system.

Tire inflation indicator assembly 19 may include a plurality of different colored indicators or lamps in order to indicate various inflation conditions of the tires of vehicle 12. Such indicators can be coded (such as by color coding, intensity coding, frequency of flash coding, sequence coding, positional coding or the like) in order to signal to the driver when the tire pressure is below, at, or above the desired tire pressure. For example, one such indicator may be a green indicator which indicates that the pressure of the monitored tire or tires is within an acceptable pressure range, such as recommended by the manufacturer of the vehicle. A red indicator may illuminate when the pressure monitored by pressure sensor 20 is less than that recommended by the vehicle operator. The red indicator may flash when the pressure sensed by a pressure sensor 20 is greater than the range of pressures recommended by the vehicle manufacturer. Preferably, tire inflation indicator assembly 19 includes a single color indicator in order to reduce the cost thereof. The single color indicator may, for example, be a green indicator which is illuminated in a steady fashion when the pressure sensed by tire pressure sensor 20 is within an acceptable range recommended by the vehicle manufacturer and flashing when outside of that range. Preferably, the indicator may flash at a first rate, such as at a relatively slow rate, when the pressure sensed by the pressure sensor 20 is less than the range recommended by the vehicle manufacturer and at a faster rate when the pressure sensed by sensor 20 is above the range recommended by the vehicle manufacturer. This single color indicator could be in an OFF condition during inflation of the tire until the inflation condition reaches the normal operating range recommended by the vehicle manufacturer. Other lamp operation protocols may suggest themselves to the skilled artisan.

In an embodiment of a tire inflation indicator assembly 19c, a first indication 40 is provided in response to pressure sensed by the tire pressure sensor(s) being substantially within a predetermined normal range (42) (FIG. 7). Indicator assembly 19c produces a second indication 44 in response to pressure sensed by the tire pressure sensor(s) being substantially less than the normal range (46). Indicator assembly 19c produces a third indication 48 in response to pressure sensed by the tire pressure sensor(s) being substantially greater than the normal pressure range (50). Indicator assembly 19c produces a fourth indication 52 in response to pressure sensed by the tire pressure sensor(s) undergoing change that is indicative of the associated tire undergoing inflation (54).

Preferably, tire inflation indicator 19 includes one or more light-emitting light sources, such as solid-state light emitting diodes (LED), available from numerous sources. Various colors of LED can be used (or combined) such as blue, white, orange, yellow, red, amber and red-orange. Alternatively, the tire inflation indicator may be supplied as a conventional incandescent light source, a halogen light source, a fluorescent light source such as a vacuum fluorescent lamp, a light pipe such as fiber-optic bundle forming a light pipe, and the like. Most preferably, illumination by the tire inflation indicator is achieved using non-incandescent light sources, such as light-emitting diodes (LEDs), organic light-emitting material, electroluminescent sources (both organic and inorganic), and the like, and most preferably such non-incandescent sources are low power and are directed sources, such as described in U.S. Pat. No. 5,938,321 and copending application entitled "INTERIOR MIRROR ASSEMBLY FOR A VEHICLE INCORPORATING A SOLID-STATE LIGHT SOURCE", Ser. No. 09/287,926, filed Apr. 7, 1999, which are incorporated herein by reference in their entireties, and in such as is disclosed in co-pending and co-assigned U.S. pateny application Ser. No. 09/466,010 filed Dec. 17, 1999, the entire disclosure of which is hereby incorporated by reference herein, and in co-pending and co-assigned U.S. patent application Ser. No. 09/449,121 filed Nov. 24, 1999 now U.S. Pat. No. 6,139,172 and entitled "Rearview Mirror Assembly With Utility Functions", by Barry W. Hutzel et al. of Donnelly Corporation, the entire disclosure of which is hereby incorporated by reference herein.

The light source of tire inflation indicator assembly 19 can include a lens, which may be supplied as a segmented lens, a prismatic lens, or a Fresnel lens, which may be clear or tinted, and may be provided over such light source.

Other modifications may include providing an input 36 from a vehicle keyless entry system. Control 18 may respond to input 36 by providing outputs to illuminate tire inflation indicators 19 upon the user operating the keyless entry system to unlock the doors. The control 18 would preferably illuminate tire inflation indicator assemblies 19 upon actuation of the keyless entry system until the outputs to the tire inflation indicator assemblies are locked out by receiving an input 32 indicating that the vehicle is operating and/or until after a predetermined time interval, determined by timeout 37, has elapsed. Although the invention is illustrated in use with an exterior vehicle portion such as exterior rearview mirror assemblies, a tire inflation indicator assembly, according to the invention, could also be positioned within the interior cabin of the vehicle, such as at a vehicle interior rearview mirror assembly 228 (FIG. 1), or at an inner cabin roof portion such as a header console 229, or at an instrumentation panel 227, or the like. However, this is less preferred as an interior cabin portion such as the interior mirror assembly is not as readily visible to a person inflating a tire mounted on a vehicular wheel (as compared to mounting the indicator of the tire inflation indicator assembly on an exterior vehicle portion such as an exterior side view mirror assembly, or at/on a side marker turn indicator, or at/on an exterior side body panel such as a door panel, wheel well, fender portion or at/on a door handle assembly or the like). Also, the tire inflation indicator assembly can optionally be provided as part of the vehicle wheel assembly itself. For example, the valve provided at the wheel tire to inflate the tire can include a tire inflation indicator assembly [such as a non-incandescent light emitting source such as an electroluminescent source (organic or inorganic) or a light-emitting diode] which has a light emission coded to the inflation status of the tire.

Also, the tire inflation indicator assembly, according to the invention, can be mounted at, or combined with, a light assembly already present on an exterior vehicle portion such as a mirror-mounted turn signal or a side marker turn signal or an exterior mirror-mounted security light. Thus, for example, a side marker turn signal light source present on the side body panel for the purpose of signaling a lane change when a turn signal stalk in the interior vehicle cabin is actuated can also serve the dual purpose of acting as the tire inflation indicator for the tire inflation indicator assembly, according to the invention, and with the inflation status being indicated to the person inflating a tire on the side of the vehicle on which the side marker turn signal is mounted by flashing the turn signal to a code pattern determined and understood to signal a below-desired tire pressure state, a desired tire pressure state, and/or an overly inflated tire pressure state. Likewise, a mirror-mounted signal light or a security light, such as are disclosed in U.S. Pat. No. 5,669,704, the entire disclosure of which is hereby incorporated by reference herein, can be similarly used for dual-purposes.

Thus, it is seen that the present invention provides a tire inflation monitoring system which provides a useful adjunct to the inflation of the vehicle tires. Because the tire inflation indicator assembly is positioned at or on an exterior vehicle portion such as a body side panel or on an exterior rearview mirror assembly where it is readily visible from the area surrounding each of the vehicle tires, it facilitates rapid adjustment of the inflation condition of the tires, thus increasing the safe operation of the vehicle. Also, preferably, the tire inflation indicator assembly is positioned on the exterior body portion at a location readily visible to a person crouching down at a wheel tire to inflate.

Furthermore, a tire inflation monitoring system, according to the invention, provides a useful indication to the vehicle user when the user is entering or leaving the vehicle that the tire pressure monitored by each of the tire inflation indicator assemblies is within a range of pressure as recommended by the manufacturer or outside of that range, thus alerting the user to take action to bring the pressure of the tire within the range specified by the manufacturer preferably before operating the vehicle.

Other modifications may suggest themselves to the skilled artisan. For example, a single tire inflation indicator assembly 19 may include one color indicator for the rear tire on that side of the vehicle and a different color indicator for the front tire on that side of the vehicle. Alternatively, one tire inflation indicator assembly may be provided for indicating the tire inflation condition of the rear tire assembly, and a different tire inflation indicator assembly may indicate the direct inflation condition of the front tire on that side of the vehicle.

Also, communication between components of the tire inflation assistance monitoring system of this present invention can be by wire (such as a direct wire connection or via an optical fiber link) or via a bus system (such as a CAN or LIN system, as known in the arts) or wirelessly such as by IR or RF communication (such as using a local area RF broadcast network such as the BLUETOOTH protocol from Motorola of Schaumberg, Ill.), such as is disclosed in co-pending and co-assigned U.S. patent application Ser. No. 09/466,010 filed Dec. 17, 1999, the entire disclosure of which is hereby incorporated by reference herein, and in co-pending and co-assigned U.S. patent application Ser. No. 09/449,121 filed Nov. 24, 1999, and entitled "Rearview Mirror Assembly With Utility Functions", by Barry W. Hutzel et al. of Donnelly Corporation, the entire disclosure of which is hereby incorporated by reference herein.

The present invention provides a method of assisting manual tire inflation by a person whereby, for example, a driver can pull up to an air compressor station at a service station, turn off the vehicle engine and exit the vehicle, and crouch down at a particular wheel tire to inflate using the air hose provided at the service center. Upon connecting the air hose to the valve stem of that tire, the driver can view an indicator provided at an exterior vehicle portion such as on the underside of the casing that houses the exterior mirror reflector in the exterior side view mirror assembly on that side of the vehicle. Upon commencing the tire pressure adjust event, the driver can view the indicator, whose illumination is coded to indicate the tire pressure status (whether it be in an under pressure condition, a correct pressure condition or an over pressure condition). Guided by the coded illumination of the indicator(s) provided external the vehicle, and while still crouched in the act of adjusting tire pressure, the driver can inflate/deflate that tire's pressure to the recommended, desired pressure level (a pressure level preferably stored in a memory of the vehicle).

Other changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicular exterior rearview mirror system, comprising:
   at least one exterior rearview mirror assembly mounted on a side of a vehicle, said exterior rearview mirror assembly comprising a reflective element and a support for said reflective element; and
   a tire inflation monitoring system including at least one tire inflation indicator assembly positioned at said at least one exterior rearview mirror assembly and visible exterior the vehicle, said at least one tire inflation indicator assembly providing an indication of the inflation condition of at least one vehicle tire, wherein said tire inflation monitoring system includes a control receiving at least one input from at least one tire pressure sensor sensing pressure of the at least one vehicle tire and said control producing an output to illuminate said at least one tire inflation indicator assembly.

2. The vehicular exterior rearview mirror system in claim 1 wherein said support comprises a fixed portion attached to the vehicle and a movable portion.

3. The vehicular exterior rearview mirror system in claim 1 wherein said at least one tire inflation indicator assembly produces a pattern of light that does not substantially extend to a driver of the vehicle, wherein the vehicle driver is substantially unaware of an indication by said at least one tire inflation indicator assembly.

4. The vehicular exterior rearview mirror system in claim 1 wherein said control receives an input indicative of operation of the vehicle.

5. The vehicle exterior rearview mirror system in claim 4 wherein said control includes a lockout function which precludes producing said output during operation of the vehicle.

6. The vehicle exterior rearview mirror system in claim 5 wherein said control produces said output during a particular period of time after operation of the vehicle is discontinued.

7. The vehicle exterior rearview mirror system in claim 6 wherein said period of time is less than or equal to about 2 hours.

8. The vehicle exterior rearview mirror system in claim 6 wherein said period of time is less than or equal to about 30 minutes.

9. The vehicle exterior rearview mirror system in claim 6 wherein said period of time is less than or equal to about 15 minutes.

10. The vehicle exterior rearview mirror system in claim 5 wherein said control receives another input from a vehicle door lock sensor and produces said output in response to the vehicle door being in an unlocked state.

11. The vehicle exterior rearview mirror system in claim 10 wherein said control produces said output for a predetermined period of time in response to said door lock sensor indicating the vehicle door changes to an unlocked state.

12. The vehicle exterior rearview mirror system in claim 11 wherein said predetermined period of time is less than or equal to about 2 hours.

13. The vehicle exterior rearview mirror system in claim 11 wherein said predetermined period of time is less than or equal to about 30 minutes.

14. The vehicle exterior rearview mirror system in claim 11 wherein said predetermined period of time is less than or equal to about 15 minutes.

15. The vehicle exterior rearview mirror system in claim 1 wherein said control receives an input from a vehicle door lock sensor and produces said output in response to the vehicle door being in an unlocked state.

16. The vehicle exterior rearview mirror system in claim 15 wherein said control produces said output for a predetermined period of time in response to said door lock sensor indicating the vehicle door changes to an unlocked state.

17. The vehicle exterior rearview mirror system in claim 16 wherein said predetermined period of time is less than or equal to about 2 hours.

18. The vehicle exterior rearview mirror system in claim 16 wherein said predetermined period of time is less than or equal to about 30 minutes.

19. The vehicle exterior rearview mirror system in claim 16 wherein said predetermined period of time is less than or equal to about 15 minutes.

20. The vehicle exterior rearview mirror system in claim 1 wherein said control produces said output in response to said at least one tire pressure sensor sensing a substantial change in tire pressure.

21. The vehicle exterior rearview mirror system in claim 1 wherein said at least one tire pressure indicator assembly produces a first indication in response to pressure sensed by said at least one tire pressure sensor being substantially within a predetermined normal pressure range.

22. The vehicle exterior rearview mirror system in claim 21 wherein said at least one tire pressure indicator assembly produces at least one of a second indication in response to pressure sensed by said at least one tire pressure sensor being substantially less than said predetermined pressure range and a third indication in response to pressure sensed by said at least one tire pressure sensor being substantially greater than said predetermined pressure range.

23. The vehicle exterior rearview mirror system in claim 22 wherein said at least one tire pressure indicator assembly produces a fourth indication in response to pressure sensed by said at least one tire pressure sensor undergoing change indicative of the associated tire undergoing inflation.

24. The vehicle exterior rearview mirror system in claim 22 wherein said first through third indications are produced with one indication color.

25. The vehicle exterior rearview mirror system in claim 24 wherein one of said indications is produced by continuously indicating said one indication color, another of said indications is produced by flashing said one indication color at a first predetermined rate and another of said indications is produced by flashing said one indication color at a second higher predetermined rate.

26. The vehicle exterior rearview mirror system in claim 25 wherein said first indication is produced by continuously indicating said one indication color, said second indication produced by flashing said one indication color at said first predetermined rate, said third indication is produced by flashing said one indication color at said second higher predetermined rate.

27. The vehicle exterior rearview mirror system in claim 22 wherein said first through third indications are produced with more than one color.

28. The vehicle exterior rearview mirror system in claim 27 wherein said first indication is produced by indication with one said color, said second indication is produced with a different said color and said third indication is produced by flashing said different color.

29. A vehicular exterior rearview mirror system, comprising:
at least one exterior rearview mirror assembly mounted on a side of a vehicle, said exterior rearview mirror assembly comprising a reflective element and a support for said reflective element, wherein said support comprises a fixed portion attached to the vehicle and a movable portion; and
a tire inflation monitoring system including at least one tire inflation indicator assembly positioned at said at least one exterior rearview mirror assembly at one of said fixed portion and said movable portion, said at least one tire inflation indicator assembly visible exterior the vehicle and providing an indication of the inflation condition of at least one vehicle tire, wherein said tire inflation monitoring system includes a control receiving at least one input from at least one tire pressure sensor sensing pressure of the at least one vehicle tire and said control producing an output to illuminate said at least one tire inflation indicator assembly.

30. The vehicular exterior rearview mirror system in claim 29 wherein said at least one tire inflation indicator assembly is positioned at said fixed portion and visible forward and rearward of the at least one exterior rearview mirror assembly.

31. The vehicular exterior rearview mirror system in claim 29 wherein said at least one tire inflation indicator assembly is positioned at an under surface of said fixed portion.

32. The vehicular exterior rearview mirror system in claim 29 wherein said at least one tire inflation indicator assembly is positioned at said fixed portion adjacent said reflective element.

33. The vehicular exterior rearview mirror system in claim 29 wherein said at least one tire inflation indicator assembly is positioned at said movable portion and viewable through at least a portion of said reflective element.

34. The vehicle exterior rearview mirror system in claim 33 wherein said reflective element comprises a reflectance coating and wherein said at least one tire inflation assembly is viewable through a portion of said reflective element, wherein said reflectance coating is removed.

35. A vehicular exterior rearview mirror system, comprising:
a plurality of exterior rearview mirror assemblies, mounted on opposite sides of a vehicle, said exterior rearview mirror assemblies each comprising a reflective element and a support for said reflective element; and
a tire inflation monitoring system including a tire inflation indicator assembly at each of said exterior rearview mirror assemblies and visible exterior the vehicle, each said tire indicator assembly providing indication of the inflation condition of the vehicle tires on the same side of the vehicle as the one of said exterior rearview mirror assemblies at which that indicator assembly is positioned, wherein said tire inflation monitoring system includes a control receiving inputs from tire pressure sensors sensing pressure of the vehicle tires and said control producing outputs to illuminate said tire inflation indicator assemblies.

36. The vehicular exterior rearview mirror system in claim 35 wherein said support comprises a fixed portion attached to the vehicle and a movable portion.

37. The vehicular exterior rearview mirror system in claim 35 wherein said tire inflation indicator assembly produces a pattern of light that does not substantially extend to a driver of the vehicle, wherein the vehicle driver is substantially unaware of an indication by said indicator assembly.

38. The vehicular exterior rearview mirror system in claim 35 wherein said control receives an input indicative of operation of the vehicle.

39. The vehicle exterior rearview mirror system in claim 38 wherein said control includes a lockout function which precludes producing said outputs during operation of the vehicle.

40. The vehicle exterior rearview mirror system in claim 39 wherein said control produces said outputs during a particular period of time after operation of the vehicle is discontinued.

41. The vehicle exterior rearview mirror system in claim 40 wherein said period of time is less than or equal to about 2 hours.

42. The vehicle exterior rearview mirror system in claim 40 wherein said period of time is less than or equal to about 30 minutes.

43. The vehicle exterior rearview mirror system in claim 40 wherein said period of time is less than or equal to about 15 minutes.

44. The vehicle exterior rearview mirror system in claim 39 wherein said control receives another input from a vehicle door lock sensor and produces said outputs in response to the vehicle doors being in an unlocked state.

45. The vehicle exterior rearview mirror system in claim 44 wherein said control produces said outputs for a predetermined period of time in response to said door lock sensor indicating the vehicle door changes to an unlocked state.

46. The vehicle exterior rearview mirror system in claim 45 wherein said predetermined period of time is less than or equal to about 2 hours.

47. The vehicle exterior rearview mirror system in claim 45 wherein said predetermined period of time is less than or equal to about 30 minutes.

48. The vehicle exterior rearview mirror system in claim 45 wherein said predetermined period of time is less than or equal to about 15 minutes.

49. The vehicle exterior rearview mirror system in claim 35 wherein said control receives an input from a vehicle door lock sensor and produces said outputs in response to the vehicle door being in an unlocked state.

50. The vehicle exterior rearview mirror system in claim 49 wherein said control produces said output for a predetermined period of time in response to said door lock sensor indicating the vehicle door changes to an unlocked state.

51. The vehicle exterior rearview mirror system in claim 50 wherein said predetermined period of time is less than or equal to about 2 hours.

52. The vehicle exterior rearview mirror system in claim 50 wherein said predetermined period of time is less than or equal to about 30 minutes.

53. The vehicle exterior rearview mirror system in claim 50 wherein said predetermined period of time is less than or equal to about 15 minutes.

54. The vehicle exterior rearview mirror system in claim 35 wherein said control produces said outputs in response to an associated said tire pressure sensor sensing a substantial change in tire pressure.

55. The vehicle exterior rearview mirror system in claim 35 wherein said tire inflation indicator assembly produces a first indication in response to pressure sensed by an associated said tire pressure sensor being substantially within a predetermined normal pressure range.

56. The vehicle exterior rearview mirror system in claim 55 wherein said tire inflation indicator assembly produces at least one of a second indication in response to pressure sensed by an associated said tire pressure sensor being substantially less than said predetermined pressure range and a third indication in response to pressure sensed by an associated said tire pressure sensor being substantially greater than said predetermined pressure range.

57. The vehicle exterior rearview mirror system in claim 56 wherein said tire inflation indicator assembly produces a fourth indication in response to pressure sensed by an associated said tire pressure sensor undergoing change indicative of the associated tire undergoing inflation.

58. The vehicle exterior rearview mirror system in claim 56 wherein said first through third indications are produced with one indication color.

59. The vehicle exterior rearview mirror system in claim 58 wherein one of said indications is produced by continuously indicating said one indication color, another of said indications is produced by flashing said one indication color at a first predetermined rate and another of said indications is produced by flashing said one indication color at a second higher predetermined rate.

60. The vehicle exterior rearview mirror system in claim 59 wherein said first indication is produced by continuously indicating said one indication color, said second indication is produced by flashing said one indication color at said first predetermined rate, said third indication is produced by flashing said one indication color at said second higher predetermined rate.

61. The vehicle exterior rearview mirror system in claim 56 wherein said first through third indications are produced with more than one color.

62. The vehicular exterior rearview mirror system in claim 61 wherein said first indication is produced by indication with one said color, said second indication is produced with a different said color and said third indication is produced by flashing said different color.

63. A vehicular exterior rearview mirror system, comprising:

a plurality of exterior rearview mirror assemblies, mounted on opposite sides of a vehicle, said exterior rearview mirror assemblies each comprising a reflective element and a support for said reflective element, wherein said support comprises a fixed portion attached to the vehicle and a movable portion; and a tire inflation monitoring system including a tire inflation indicator assembly at each of said exterior rearview mirror assemblies at one of said fixed portion and said movable portion, each said tire inflation assembly visible exterior the vehicle and providing indication of the inflation condition of the vehicle tires on the same side of the vehicle as the one of said exterior rearview mirror assemblies at which that indicator assembly is positioned, wherein said tire inflation monitoring system includes a control receiving inputs from tire pressure sensors sensing pressure of the vehicle tires and said control producing outputs to illuminate said tire inflation indicator assemblies.

64. The vehicular exterior rearview mirror system in claim 63 wherein said tire inflation indicator assembly is positioned at said fixed portion and visible forward and rearward of the associated exterior rearview mirror assembly.

65. The vehicular exterior rearview mirror system in claim 63 wherein said tire inflation indicator assembly is positioned at an under surface of said fixed portion.

66. The vehicular exterior rearview mirror system in claim 63 wherein said tire inflation indicator assembly is positioned at said fixed positioned adjacent said reflective element.

67. The vehicular exterior rearview mirror system in claim 63 wherein said tire inflation indicator assembly is positioned at said movable portion and viewable through at least a portion of said reflective element.

68. The vehicular exterior rearview mirror system in claim 67 wherein said reflective element comprised a reflectance coating and wherein said tire inflation indicator assembly is viewable through a portion of said reflective element, wherein said reflectance coating is removed.

69. A tire inflation monitoring system suitable for use on a vehicle comprising:

at least one tire inflation indicator assembly positioned at an exterior vehicle portion at a side of the vehicle and visible exterior the vehicle, said at least one tire inflation indicator assembly providing an indication of the inflation condition of at least one vehicle tire positioned at said side of the vehicle, wherein said tire inflation monitoring system includes a control receiving at least one input from at least one tire pressure sensor sensing pressure of the at least one vehicle tire and said control producing an output to illuminate said at least one tire inflation indicator assembly in response to a tire pressure condition, wherein said at least one tire inflation indicator assembly is positioned at an under surface of said exterior vehicle portion.

* * * * *

UNITED STATES PATENT AND TRADEMARK OFFICE
CERTIFICATE OF CORRECTION

PATENT NO.     : 6,294,989 B1                                          Page 1 of 1
DATED          : September 25, 2001
INVENTOR(S)    : Kenneth Schofield and Niall R. Lynam It is certified that error appears in the above-identified patent and that said Letters Patent is hereby corrected as shown below:

Column 9,
Line 17, insert -- now U.S. Patent No. 6,139,172 -- after "1999"
Line 23, delete "now U.S. Patent No. 6,139,172"

Column 13,
Line 58, insert -- indicator -- after "inflation"

Column 16,
Line 28, delete "said fixed positioned" and insert -- said fixed portion --

Signed and Sealed this

Fifth Day of August, 2003

JAMES E. ROGAN
*Director of the United States Patent and Trademark Office*